US009650451B2

(12) United States Patent
Sumida et al.

(10) Patent No.: US 9,650,451 B2
(45) Date of Patent: May 16, 2017

(54) FLUORINE-CONTAINING COMPOUNDS AND THEIR POLYMERS USEFUL FOR ANTI-REFLECTION FILM MATERIALS AND RESIST COMPOSITIONS

(71) Applicant: Central Glass Company, Limited, Ube-shi, Yamaguchi (JP)

(72) Inventors: Shinichi Sumida, Saitama (JP); Haruhiko Komoriya, Saitama (JP); Kazuhiko Maeda, Tokyo (JP)

(73) Assignee: Central Glass Company, Limited, Ube-shi (JP)

( * ) Notice: Subject to any disclaimer, the term of this patent is extended or adjusted under 35 U.S.C. 154(b) by 408 days.

(21) Appl. No.: 14/188,154

(22) Filed: Feb. 24, 2014

(65) Prior Publication Data

US 2014/0171584 A1 Jun. 19, 2014

Related U.S. Application Data

(62) Division of application No. 13/094,281, filed on Apr. 26, 2011, now Pat. No. 8,691,491, and a division of application No. 11/492,057, filed on Jul. 25, 2006, now Pat. No. 7,947,422, and a division of application No. 10/634,997, filed on Aug. 6, 2003, now Pat. No. 7,125,943.

(30) Foreign Application Priority Data

Aug. 7, 2002 (JP) ................................ 2002-229552

(51) Int. Cl.

| | |
|---|---|
| ***C08F 20/30*** | (2006.01) |
| ***C09D 133/16*** | (2006.01) |
| ***C08F 14/18*** | (2006.01) |
| ***C08F 216/14*** | (2006.01) |
| ***C08F 220/24*** | (2006.01) |
| ***C08F 220/30*** | (2006.01) |
| ***C09D 125/16*** | (2006.01) |
| ***C08F 20/28*** | (2006.01) |

(52) U.S. Cl.

CPC .............. *C08F 20/30* (2013.01); *C08F 14/18* (2013.01); *C08F 20/28* (2013.01); *C08F 216/1408* (2013.01); *C08F 220/24* (2013.01); *C08F 220/30* (2013.01); *C09D 125/16* (2013.01); *C09D 133/16* (2013.01); *Y10S 430/108* (2013.01); *Y10S 430/111* (2013.01)

(58) Field of Classification Search

USPC .......................................... 526/245; 524/544

See application file for complete search history.

(56) References Cited

U.S. PATENT DOCUMENTS 6,136,499 A * 10/2000 Goodall ................. C08G 61/08 430/270.1
7,125,943 B2 * 10/2006 Sumida ................... C08F 14/18 430/270.1
7,402,626 B2 7/2008 Maeda et al.
7,947,422 B2 * 5/2011 Sumida ................... C08F 14/18 430/270.1
8,691,491 B2 * 4/2014 Sumida ................... C08F 14/18 430/270.1
2002/0160297 A1 * 10/2002 Fedynyshyn ......... G03F 7/0046 430/270.1
2003/0082479 A1 * 5/2003 Hatakeyama ......... G03F 7/0395 430/270.1
2003/0099901 A1 5/2003 Hatakeyama et al.
2005/0250898 A1 11/2005 Maeda et al.

FOREIGN PATENT DOCUMENTS

JP 2004-83900 A 3/2004

OTHER PUBLICATIONS

Farah et al., "Perhalo Ketones VII. Phenolic Derivatives of the Perhaloacetone," Journal of Organic Chemistry, 30(4), ; pp. 1003-1005 (1965).*

Farah et al. "Perhalo Ketones VII. Phenolic Derivatives of the Perhaloacetone", Journal of Organic Chemistry, 30(4); 1965, pp. 1003-1005.

John McMurray, Fundamentals of Organic Chemistry, Fourth Edition, 1998, pp. 164-166.

John McMurray, Fundamentals of Organic Chemistry, Fourth Edition, Dec. 28, 1995, pp. 164-166.

* cited by examiner

*Primary Examiner* — Mark Kaucher
*Assistant Examiner* — Henry Hu
(74) *Attorney, Agent, or Firm* — Crowell & Moring LLP

(57) ABSTRACT

A fluorine-containing compound represented by the formula 1,

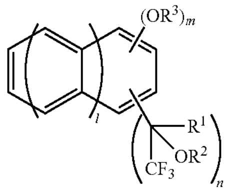

(1)

where $R^1$ is a methyl group or trifluoromethyl group, each of $R^2$ and $R^3$ is independently a hydrogen atom or a group containing (a) a hydrocarbon group having a straight-chain, branched or ring form and having a carbon atom number of 1-25 or (b) an aromatic hydrocarbon group, the group optionally containing at least one of a fluorine atom, an oxygen atom and a carbonyl bond, l is an integer of from 0 to 2, each of m and n is independently an integer of 1-5 to satisfy an expression of $m+n \leq 6$, and when at least one of $R^1$, $R^2$ and $R^3$ is in a plural number, the at least one of $R^1$, $R^2$ and $R^3$ may be identical with or different from each other.

5 Claims, No Drawings

FLUORINE-CONTAINING COMPOUNDS AND THEIR POLYMERS USEFUL FOR ANTI-REFLECTION FILM MATERIALS AND RESIST COMPOSITIONS

CROSS-REFERENCE TO RELATED APPLICATIONS

The present application is a division of U.S. application Ser. No. 13/094,281, filed on Apr. 26, 2011, now U.S. Pat. No. 8,691,491, which is a division of U.S. application Ser. No. 11/492,057, filed Jul. 25, 2006, now U.S. Pat. No. 7,947,422, which in turn is a division of U.S. application Ser. No. 10/634,997, filed Aug. 6, 2003, now U.S. Pat. No. 7,125,943, which claims priority from Japanese Application No. JP 2002-229552, filed Aug. 7, 2002. The disclosures of the above-identified documents are hereby incorporated by reference in their entireties into the present application.

BACKGROUND OF THE INVENTION

The present invention relates to (a) novel, fluorine-containing compounds containing a special structure, that is, a hydroxyl group or a substituent formed by modifying hydroxyl group, (b) polymers prepared by polymerization or copolymerization of such compounds, (c) resist compositions using such compounds or polymers, and (d) anti-reflection coating materials using such polymers.

Fluorine-containing compounds have been used in various fields particularly in the field of advanced materials due to their good qualities (e.g., water repellency, oil repellency, low water absorption, heat resistance, weather resistance, corrosion resistance, transparency, photosensitivity, low refractive index, and low dielectric property). In particular, fluorine-containing compounds are applied to the field of coating materials due to their transparency at their specific wavelengths. For example, they are used for anti-reflection films due to their transparency in the visible light region, for optical devices in a long wavelength region (optical communication wavelength band), and for resist compositions in ultraviolet region (particularly vacuum ultraviolet wavelength region). There have been active researches and developments of fluorine-containing compounds for such uses. To satisfy sophisticated and diversified requests, there are demands for producing a dissolution inhibitor that is superior in transparency, adhesion to substrate, and etching resistance and thereby is suitable for anti-reflection film materials, resist compositions.

Hitherto, there have not been obtained anti-reflection film materials or resist compositions that have high transparency and low refractive index in a wide wavelength region from ultraviolet region to near infrared region and that are superior in adhesion to substrate, film-forming property, etching resistance and durability.

SUMMARY OF THE INVENTION

It is therefore an object of the present invention to provide a novel fluorine-containing compound capable of providing a polymer that has (a) high transparency and low refractive index in a wide wavelength region from ultraviolet region to near infrared region, (b) improved adhesion to the substrate, (c) improved film forming property, (d) improved etching resistance, and (e) durability.

It is another object of the present invention to provide the polymer prepared by a polymerization or copolymerization using the fluorine-containing compound.

It is a further object of the present invention to provide an anti-reflection coating material or resist composition prepared by using the fluorine-containing compound or the polymer.

According to the present invention, there is provided a fluorine-containing compound represented by the formula 1, (1)

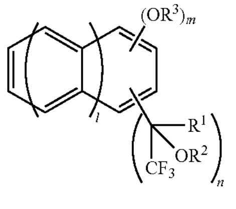

where $R^1$ is a methyl group or trifluoromethyl group, each of $R^2$ and $R^3$ is independently a hydrogen atom or a group containing (a) a hydrocarbon group having a straight-chain, branched or ring form and having a carbon atom number of 1-25 or (b) an aromatic hydrocarbon group, the group optionally containing at least one of a fluorine atom, an oxygen atom and a carbonyl bond, l is an integer of from 0 to 2, each of m and n is independently an integer of 1-5 to satisfy an expression of $m+n \leq 6$, and when at least one of $R^1$, $R^2$ and $R^3$ is in a plural number, the at least one of $R^1$, $R^2$ and $R^3$ may be identical with or different from each other.

According to the present invention, there is provided a fluorine-containing compound represented by the formula 2, (2)

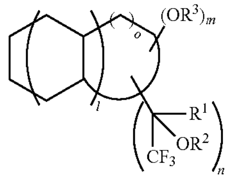

where $R^1$, $R^2$ and $R^3$ are defined as in the formula 1, l is an integer of from 0 to 2, each of m and n is independently an integer of 1-9 and o is an integer of 1-8 to satisfy an expression of $m+n \leq o+2$, and when at least one of $R^1$, $R^2$ and $R^3$ is in a plural number, the at least one of $R^1$, $R^2$ and $R^3$ may be identical with or different from each other.

According to the present invention, there is provided a fluorine-containing compound represented by the formula 3, (3)

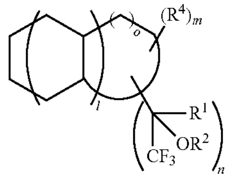

where $R^1$ and $R^2$ are defined as in the formula 1, $R^4$ is independently a hydrogen atom or a group containing (a) a hydrocarbon group having a straight-chain, branched or ring form and having a carbon atom number of 1-25 or (b) an aromatic hydrocarbon group, the group optionally containing at least one of a fluorine atom, an oxygen atom and a carbonyl bond, l is an integer of from 0 to 2, each of m and n is independently an integer of 1-9 and o is an integer of 1-8 to satisfy an expression of m+n≤o+2, and when at least one of $R^1$, $R^2$ and $R^4$ is in a plural number, the at least one of $R^1$, $R^2$ and $R^4$ may be identical with or different from each other.

According to the present invention, there is provided a polymer prepared by a polymerization or copolymerization using the fluorine-containing compound of the formula 1, 2 or 3.

According to the present invention, there is provided an anti-reflection coating material or resist composition, comprising the polymer.

DESCRIPTION OF PREFERRED EMBODIMENTS

The inventors have synthesized the above-mentioned fluorine-containing compounds (i.e., alicyclic and aromatic fluorine-containing compounds having a hydroxyl group or functional group obtained by modifying hydroxyl group) and polymers using such compounds. We unexpectedly found that resist compositions obtained by using such compounds or polymers and anti-reflection film materials obtained by using such polymers have (a) high transparency and low refractive index in a wide wavelength region from ultraviolet region to near infrared region, (b) improved adhesion to the substrate, (c) improved film forming property, (d) improved etching resistance, and (e) durability. We further unexpectedly found that the fluorine-containing compounds and their polymers are suitable as a dissolution inhibitor.

As will be described in detail hereinafter, the present invention provides fluorine-containing compounds represented by the above-mentioned formulas 1-3 and by the after-mentioned formulas 4-9, a polymer represented by the after-mentioned formula 10, and fluorine-containing compounds represented by the after-mentioned formulas 11-13. The compound of the formula 11 is suitable for anti-reflection film materials, and those of the formulas 12, 13 are suitable for resist compositions.

As stated above, $R^1$ is a methyl group or trifluoromethyl group in the general formula 1, 2, or 3. In order to achieve low refractive index and high transparency (particularly in the ultraviolet wavelength region), $R^1$ is preferably a trifluoromethyl group.

As stated above, each of the groups $R^2$, $R^3$ and $R^4$ may be independently a hydrogen atom, a hydrocarbon group, or an aromatic hydrocarbon group. This hydrocarbon group has a straight-chain, branched or ring form and has a carbon atom number of 1-25. Furthermore, each of these groups may independently optionally contain at least one of a fluorine atom(s), an oxygen atom(s) and a carbonyl bond(s). Although the structures of the groups $R^2$, $R^3$ and $R^4$ are not particularly limited, these groups can be modified with suitable substituents depending on the use of the resulting compounds and/or polymers. For example, the use of suitable substituents can provide the crosslinking property, the positive type photosensitivity (achieved by photoacid generator) and etching resistance for the purpose of having solubility in organic solvents and basic aqueous solutions, high glass transition point, and heat resistance in soldering.

The above-mentioned $C_1$-$C_{25}$ hydrocarbon group or aromatic group as $R^2$, $R^3$ or $R^4$ may be selected from methyl group, ethyl group, propyl group, isopropyl group, cyclopropyl group, n-propyl group, sec-butyl group, tert-butyl group, n-pentyl group, cyclopentyl group, sec-pentyl group, neopentyl group, hexyl group, cyclohexyl group, ethylhexyl group, norbornel group, adamantyl group, vinyl group, allyl group, butenyl group, pentenyl group, ethynyl group, phenyl group, benzyl group, and 4-methoxybenzyl group. These functional groups may be ones in which hydrogen atoms have been partially or fully replaced with fluorine atoms. The group $R^2$, $R^3$ or $R^4$ containing an oxygen atom(s) may be an alkoxycarbonyl group, acetal group, or acyl group. Examples of this alkoxycarbonyl group include tert-butoxycarbonyl group, tert-amyloxycarbonyl group, methoxycarbonyl group, ethoxycarbonyl group, and i-propoxycarbonyl group. Examples of the acetal group include (a) acyclic ether groups such as methoxymethyl group, methoxyethoxymethyl group, ethoxyethyl group, butoxyethyl group, cyclohexyloxyethyl group, benzyloxyethyl group, phenethyloxyethyl group, ethoxypropyl group, benzyloxypropyl group, phenethyloxypropyl group, ethoxybutyl group and ethoxyisobutyl group and (b) cyclic ether groups such as tetrahydrofuranyl group and tetrahydropyranyl group. Examples of the acyl group include acetyl group, propionyl group, butyryl group, heptanoyl group, hexanoyl group, valeryl group, pivaloyl group, isovaleryl group, lauryloyl group, myristoyl group, palmiotyl group, stearoyl group, oxalyl group, malonyl group, succinyl group, glutaryl group, adipoyl group, piperoyl group, suberoyl group, azelaoyl group, sebacoyl group, acryloyl group, propioloyl group, methacryloyl group, crotonoyl group, oleoyl group, maleoyl group, fumaroyl group, mesaconoyl group, campholoyl group, benzoyl group, phthaloyl group, isophthaloyl group, terephthaloyl group, naphthoyl group, toluoyl group, hydratoropoyl group, atoropoyl group, cinnamoyl group, furoyl group, thenoyl group, nicotinoyl group, and isonicotinoyl group. Furthermore, these exemplary groups may be ones in which hydrogen atoms have been partially or fully replaced with fluorine atoms.

The fluorine-containing compounds of the formulas 1 and 2 may respectively be ones of the following formulas 4 and 5. In the invention, these fluorine-containing compounds of the formulas 4 and 5 are suitable as basic compounds for inducing various fluorine-containing monomers represented by the formulas 1 and 2.

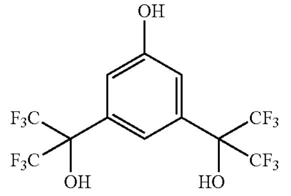

(4)

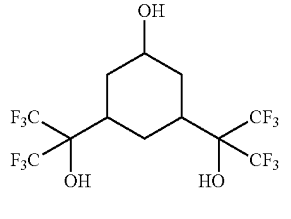

(5)

In the invention, each of the groups $R^2$ and $R^3$ may independently contain a hydrogen atom, an unsaturated bond, or an acid-labile protecting group. The acid-labile protecting group is a protecting group that becomes labile or is released by an action of acid. When $R^2$ is in a plural number, those of $R^2$ may be identical with or different from each other. The same is true for $R^3$. When $R^2$ and $R^3$ are hydrogen atoms, the resulting fluorine-containing compound (e.g., those of the formulas 4 and 5) can be used as a raw material compound for inducing various fluorine-containing compounds or as a compound to be added to a coating composition together with another resin and cross-linking agent. When $R^2$ and $R^3$ contain unsaturated bonds, the resulting fluorine-containing compound can be used as a polymerizable monomer for producing fluorine-containing polymers or copolymers or can be suitable as a raw material compound in Diels-Alder reaction and other various reactions. When at least one of $R^2$ and $R^3$ is an acid-labile protecting group, the resulting fluorine-containing compound or its polymer can be used as a dissolution inhibitor in resist use. Furthermore, a fluorine-containing compound according to the present invention may be one in which hydrogen atom, unsaturated bond and acid-labile protecting group are coexistent with each other. In case that one of $R^2$ and $R^3$ contains a polymerizable unsaturated bond, the resulting fluorine-containing compound can be used as a raw material for producing its polymers or copolymers. In case that a plural number of $R^2$ and $R^3$ contain unsaturated bonds, the resulting fluorine-containing compound can be used as a crosslinking material.

The above-mentioned $R^2$ or $R^3$ containing an unsaturated bond is not particularly limited in structure, as long as it has polymerizability or reactivity. Its examples include vinyl group, allyl group, acryloyl group, and methacryloyl group. These exemplary functional groups may be or may have fluorine-containing groups in which hydrogen atoms of the functional groups have been partially or fully replaced with fluorine atoms. Examples of such fluorine-containing group include fluorovinyl group, difluorovinyl group, trifluorovinyl group, difluorotrifluoromethylvinyl group, trifluoroallyl group, perfluoroallyl group, fluoroacryloyl group, trifluoromethylacryloyl group, and nonylfluorobutylacryloyl group. The fluorine-containing polymer containing such fluorine-containing group as $R^2$ or $R^3$ can further provide its polymer or copolymer with transparency or low refractive index.

The group $R^4$ is not particularly limited, although it is preferably a polymerizable functional group such as vinyl group, allyl group, epoxy group, and ethynyl group. Furthermore, it may be a fluorine-containing group in which hydrogen atoms have been partially or fully replaced with fluorine atoms. Examples of such fluorine-containing group include fluorovinyl group, difluorovinyl group, trifluorovinyl group, difluoro-trifluoromethylvinyl group, trifluoroallyl group, perfluoroallyl group, and trifluoroepoxy group. The above functional group as $R^4$ may be used for improving polymerizability of the fluorine-containing compound. The above fluorine-containing group as $R^4$ can further provide its polymer or copolymer with transparency or low refractive index.

As stated above, the group $R^2$ or $R^3$ may contain or may be an acid-labile protecting group. Furthermore, it may contain an acid-labile protecting group and an unsaturated bond containing group. The acid-labile protecting group may contain at least one of oxygen atom, carbonyl bond and fluorine atom.

The acid-labile protecting group usable in the present invention is not particularly limited, as long as it is released by an action of photoacid generator or hydrolysis. The acid-labile protecting group may be selected from alkoxycarbonyl group, acetal group, silyl group, and acyl group. Examples of the alkoxycarbonyl group are tert-butoxycarbonyl group, tert-amyloxycarbonyl group, methoxycarbonyl group, ethoxycarbonyl group, and i-propoxycarbonyl group. Examples of the acetal group are methoxymethyl group, ethoxyethyl group, butoxyethyl group, cyclohexyloxyethyl group, benzyloxyethyl group, phenethyloxyethyl group, ethoxypropyl group, benzyloxypropyl group, phenethyloxypropyl group, ethoxybutyl group, and ethoxyisobutyl group. When $R^2$ and $R^3$ are hydrogen atoms, the acid-labile protecting group can be an acetal group obtained by adding vinyl ether to the hydroxyl group (—$OR^2$ or —$OR^3$). Examples of the silyl group are trimethylsilyl group, ethyldimethylsilyl group, methyldiethylsilyl group, triethylsilyl group, i-propyldimethylsilyl group, methyldi-i-propylsilyl group, tri-i-propylsilyl group, t-butyldimethylsilyl group, methyldi-t-butylsilyl group, tri-t-butylsilyl group, phenyldimethylsilyl group, methyldiphenylsilyl group, and triphenylsilyl group. Examples of the acyl group are acetyl group, propionyl group, butyryl group, heptanoyl group, hexanoyl group, valeryl group, pivaloyl group, isovaleryl group, lauryloyl group, myristoyl group, palmiotyl group, stearoyl group, oxalyl group, malonyl group, succinyl group, glutaryl group, adipoyl group, piperoyl group, suberoyl group, azelaoyl group, sebacoyl group, acryloyl group, propioloyl group, methacryloyl group, crotonoyl group, oleoyl group, maleoyl group, fumaroyl group, mesaconoyl group, campholoyl group, benzoyl group, phthaloyl group, isophthaloyl group, terephthaloyl group, naphthoyl group, toluoyl group, hydratoropoyl group, cinnamoyl group, furoyl group, thenoyl group, nicotinoyl group, and isonicotinoyl group. Furthermore, these exemplary groups as the acid-labile protecting groups may be ones in which hydrogen atoms have been partially or fully replaced with fluorine atoms.

The purpose of using the acid-labile protecting group is to make the polymer achieve (1) positive type photosensitivity and (2) dissolution in basic aqueous solution after irradiation with high-energy beam of 300 nm or less (e.g., far ultraviolet radiation, excimer laser, and X-rays) or electron beam. The resulting polymer is further provided with transparency, if it contains a fluorine-containing functional group. Furthermore, the resulting polymer is further provided with etching resistance and high glass transition point, if it contains a cyclic structure.

A polymer according to the present invention is described in detail, as follows. This polymer is a homopolymer or copolymer obtained by using a fluorine-containing compound that is represented by the formula 1, 2 or 3 and contains a polymerizable unsaturated bond.

Another monomer, which is to be copolymerized with the fluorine-containing compound of the formula 1, 2 or 3, may be at least one selected from acrylic esters, methacrylic esters, fluorine-containing acrylic esters, fluorine-containing methacrylic esters, styrene, styrene derivatives (styrene compounds), fluorine-containing styrene derivatives (styrene compounds), vinyl ethers, fluorine-containing vinyl ethers, allyl ethers, fluorine-containing allyl ethers, olefins, fluorine-containing olefins, norbornene, norbornene derivatives (norbornene compounds), and fluorine-containing norbornene derivatives (norbornene compounds).

Exemplary (meth)acrylic esters (i.e., acrylic esters and methacrylic esters) for the above-mentioned another monomer are not particularly limited with respect to their ester side chains. They are (meth)acrylic alkyl esters such as methyl (meth)acrylate, ethyl (meth)acrylate, n-propyl (meth)acrylate, isopropyl (meth)acrylate, n-butyl (meth) acrylate, isobutyl (meth)acrylate, n-hexyl (meth)acrylate, n-octyl (meth)acrylate, 2-ethylhexyl (meth)acrylate, lauryl (meth)acrylate, 2-hydroxyethyl (meth)acrylate, and 2-hydroxypropyl (meth)acrylate; (meth)acrylates containing groups such as ethylene glycol, propylene glycol and tetramethylene glycol; unsaturated amides such as (meth)acrylic amide, N-methylol(meth)acrylic amide, and diacetoneacrylic amide; (meth)acrylonitrile, alkoxysilane-containing vinyl silanes and (meth)acrylic esters, tert-butyl (meth)acrylate, and cyclic (meth)acrylate such as 3-oxocyclohexyl (meth)acrylate, adamantyl (meth)acrylate, alkyladamantyl (meth)acrylate, cyclohexyl (meth)acrylate, tricyclodecanyl (meth)acrylate and (meth)acrylate having cyclic structures such as lactone ring and norbornene ring; and (meth)acrylic acid. Further examples are (meth)acrylate containing a cyano group at α-position and analogous compounds such as maleic acid, fumaric acid and maleic anhydride.

The fluorine-containing (meth)acrylic esters for the above-mentioned another monomer may have a fluorine atom or fluorine-containing group at their α-position or may have a substituent having a fluorine atom at ester moiety. Those (meth)acrylic esters may also have fluorine atoms at their α-position and ester moiety. Furthermore, they may have a cyano group at the α-position. Such fluorine-containing groups at their α-position may be trifluoromethyl group, trifluoroethyl group and nonafluoro-n-butyl group. In case that the fluorine-containing groups are contained at their α-position, their ester moiety is not necessarily required to have a fluorine-containing group. It may be preferable to use α-trifluoromethylacrylic alkyl ester as the above-mentioned another monomer, since it may become possible to provide a relatively high yield of the target polymer and an improved dissolution of the target polymer in organic solvent.

Further exemplary fluorine-containing (meth)acrylic esters as the above-mentioned another monomer may have at their ester moiety a fluoroalkyl or perfluoroalkyl group or a fluorine-containing cyclic structure. This cyclic structure may have a substituent (e.g., fluorine atom, trifluoromethyl group and hexafluorocarbinol group), and its examples are fluorine-containing benzene ring, fluorine-containing cyclopentane ring, fluorine-containing cyclohexane ring, and fluorine-containing cycloheptane ring. Further exemplary (meth)acrylic esters may have at their ester moiety a fluorine-containing t-butyl ester group. It is optional to use (meth)acrylic esters having fluorine-containing functional groups at their ester moiety and α-position. Specific examples of the fluorine-containing (meth)acrylic ester are 2,2,2-trifluoroethyl(meth)acrylate, 2,2,3,3-tetrafluoropropyl (meth)acrylate, 1,1,1,3,3,3-hexafluoroisopropyl(meth)acrylate, heptafluoroisopropyl(meth)acrylate, 1,1-dihydroheptafluoro-n-butyl(meth)acrylate, 1,1,5-trihydrooctafluoro-n-pentyl(meth)acrylate, 1,1,2,2-tetrahydrotridecafluoro-n-octyl(meth)acrylate, 1,1,2,2-tetrahydroheptadecafluoro-n-decyl(meth)acrylate, perfluorocyclohexylmethyl(meth) acrylate, 6-[3,3,3-trifluoro-2-hydroxy-2-(trifluoromethyl) propyl]bicyclo[2.2.1]heptyl-2-yl(meth)acrylate, 6-[3,3,3-trifluoro-2-hydroxy-2-(trifluoromethyl)propyl]bicyclo [2.2.1]heptyl-2-yl-2-(trifluoromethyl)(meth)acrylate, 1,4-bis(1,1,1,3,3,3-hexafluoro-2-hydroxyisopropyl)cyclohexyl (meth)acrylate, and 1,4-bis(1,1,1,3,3,3-hexafluoro-2-hydroxyisopropyl)cyclohexyl-2-trifluoromethyl(meth) acrylate.

Further examples of the above-mentioned another monomer are styrene compounds and fluorine-containing styrene compounds, such as styrene, fluorinated styrene, hydroxystyrene, and a compound in which a hexafluorocarbinol group(s) or functional group(s) (obtained by modifying the hydroxyl group of hexafluorocarbinol group) is bonded to the benzene ring. In other words, the another monomer can preferably be selected from fluorine-containing styrene and hydroxystyrene, each containing fluorine atom or trifluoromethyl group substituted for hydrogen, styrene compounds containing a halogen, an alkyl group or a fluorine-containing alkyl group at their α-position, and perfluorovinyl-containing styrene compounds.

Still further examples of the above-mentioned another monomer are vinyl ethers, fluorine-containing vinyl ethers, allyl ethers, and fluorine-containing allyl ethers. For example, the another monomer may be an alkyl vinyl ether or alkyl allyl ether that optionally contains methyl group, ethyl group, propyl group, butyl group, or hydroxyl group (e.g., hydroxyethyl group and hydroxybutyl group) and that optionally contains fluorine substituted for a part or all of the hydrogen atoms. The another monomer may be a cyclic vinyl ether or allyl ether containing a cyclohexyl group or a hydrogen or carbonyl bond in its cyclic structure. Furthermore, the another monomer can be selected from vinyl esters, vinyl silanes, olefins, fluorine-containing olefins, norbornene compounds, fluorine-containing norbornene compounds, and other compounds containing polymerizable unsaturated bonds, without any particular limitation upon use.

Exemplary olefins for the above-mentioned another monomer are ethylene, propylene, isobutene, cyclopentene, and cyclohexene. Exemplary fluorine-containing olefins for that are vinyl fluoride, vinylidene fluoride, trifluoroethylene, chlorotrifluoroethylene, tetrafluoroethylene, hexafluoropropylene, and hexafluoroisobutene.

The above-mentioned norbornene compounds and fluorine-containing norbornene compounds as examples of the another monomer may have a mononucleus or multinucleus structure. It is possible to prepare the norbornene compounds (e.g., 3-(5-bicyclo[2.2.1]-heptene-2-yl)-1,1,1-trifluoro-2-(trifluoromethyl)-2-propanol) by a Diels-Alder addition reaction of unsaturated compounds (e.g., allyl alcohol, fluorine-containing allyl alcohol, homoallyl alcohol, fluorine-containing homoalcohol, acrylic acid, α-fluoroacrylic acid, methacrylic acid, all of the above-mentioned (meth)acrylic esters and fluorine-containing (meth)acrylic esters, 2-(benzoyloxy)pentafluoropropane, 2-(methoxyethoxymethyloxy)pentafluoropropene, 2-(tetrahydroxypyranyloxy)pentafluoropropene, 2-(benzoyloxy)trifluoroethylene, and 2-(methoxymethyloxy)trifluoroethylene) to dienes (e.g., cyclopentadiene and cyclohexadiene).

The above-mentioned another monomer may be a single monomer or a combination of at least two monomers. Upon the polymerization, the ratio of the fluorine-containing compound to the another monomer is not particularly limited. The amount of the former is preferably from 10-100%, more preferably 30-100%. If it is less than 30%, the resulting polymer may become insufficient in transparency or film-forming property depending on the wavelength range for use.

The polymerization or copolymerization method for obtaining the target polymer (copolymer) is not particularly limited. For example, it is preferable to use radical polymerization or ionic polymerization. In some cases, it is also possible to use coordinated anionic polymerization or living anionic polymerization.

Particulars of the above-mentioned radical polymerization are as follows. The radical polymerization can be conducted by a known manner such as bulk polymerization, solution polymerization, suspension polymerization or emulsion polymerization by a batch-wise, half-continuous or continuous operation.

The radical polymerization initiator is not particularly limited. Its examples are azo compounds, peroxides and redox compounds. Of these, preferable ones are azobisbutyronitrile, t-butylperoxypivalate, di-t-butylperoxide, i-butyrylperoxide, lauroylperoxide, succinic acid peroxide, dicinnamylperoxide, di-n-propylperoxydicarbonate, t-butylperoxyallyl monocarbonate, benzoyl peroxide, hydrogen peroxide, and ammonium persulfate.

The reaction vessel for conducting the polymerization (copolymerization) is not particularly limited. It is optional to use a solvent for conducting the polymerization. The polymerization solvent is preferably one that does not interfere with the radical polymerization. Its typical examples are esters such as ethyl acetate and n-butyl acetate; ketones such as acetone and methyl isobutyl ketone; hydrocarbons such as toluene and cyclohexane; and alcohols such as methanol, isopropyl alcohol and ethylene glycol monomethyl ether. Furthermore, it can be selected from various other solvents such as water, ethers, cyclic ethers, fluorohydrocarbons, and aromatic solvents. It is optional to use a single solvent or a mixture of at least two solvents. Furthermore, it is possible to use a molecular weight adjusting agent, such as mercaptan, in the polymerization. The temperature for conducting the polymerization may be suitably adjusted depending on the type of radical polymerization initiator or radical polymerization initiating source. It is preferably 20-200° C., particularly preferably 30-140° C.

After the polymerization, it is possible to remove the reaction medium (i.e., organic solvent or water) from the solution or dispersion of the target polymer by a known method. For example, it can be conducted by reprecipitation followed by filtration, or by heating under vacuum to distill the medium off. The target polymer according to the present invention may have a number average molecular weight of 1,000-100,000, preferably 3,000-50,000.

The polymer according to the present invention may be formed into a film by dissolving the polymer in a solvent to prepare a coating solution and then by applying the coating solution to a substrate. This solvent is not particularly limited as long as the polymer can be dissolved therein. Its examples are ketones such as acetone, methyl ethyl ketone, cyclohexanone, methyl isoamyl ketone and 2-heptanone; polyhydric alcohols such as ethylene glycol, ethylene glycol monoacetate, diethylene glycol, diethylene glycol monoacetate, propylene glycol, propylene glycol monoacetate, dipropylene glycol, and ethers (monomethyl ether, monoethyl ether, monopropyl ether, monobutyl ether and monophenyl ether) of dipropylene glycol monoacetate, and derivatives of polyhydric alcohols; cyclic ethers such as dioxane; esters such as methyl lactate, ethyl lactate, methyl acetate, ethyl acetate, butyl acetate, methyl pyruvate, ethyl pyruvate, methyl methoxypropionate, and ethyl ethoxypropionate; aromatic solvents such as xylene and toluene; and fluorine-containing solvents such as fleon, alternative fleon, perfluoro compounds, and hexafluoroisopropyl alcohol. Furthermore, it is possible to use a high-boiling-point, weak solvent (e.g., a terpene-based petroleum naphtha solvent or paraffinic solvent) for the purpose of increasing coatability (applicability of the coating solution). The solvent for preparing the coating solution may be a single solvent or a mixture of at least two solvents.

It is possible to form an anti-reflection film on the surface of a substrate (e.g., glass, plastic, liquid crystal panel, plasma display panel, and electroluminescence panel) by applying the polymer of the present invention thereto to have an ultra-thin thickness. The anti-reflection film can be a single layer of this polymer or a laminate of at least one layer of this polymer and at least one layer of another material having a refractive index different from that of this polymer. In order to enhance its anti-reflection capability, it is preferable to adjust refractive index of the polymer in the ultraviolet or visible light region to 1.42 or lower, more preferably 1.4 or lower. As the fluorine content of the polymer increases, the refractive index becomes lower. With higher fluorine content, its adhesion to substrate tends to lower. In this case, it is possible to increase adhesion by using an anti-reflection film prepared by polymerizing a fluorine-containing compound that is represented by the formula 1 or 2 and that adhesive groups (e.g., hydrogen and lactone ring) are used for a part of $R^2$ and $R^3$. The thickness of the anti-reflection film may be varied depending on the refractive index of the substrate. It may be in a range of 50-200 nm.

A resist composition according to the present invention is (1) a first resist composition containing both of a polymer (according to or not according to the present invention) and a dissolution inhibitor of which solubility in alkali aqueous solution changes by the action of acid or (2) a second resist composition that is a polymer containing a dissolution inhibitor as a part of the structure of the polymer. In other words, a fluorine-containing compound of the present invention may serve as the dissolution inhibitor of the first resist composition, and the polymer of the present invention serves as the polymer of the second resist composition. It is particularly preferable to use the first or second resist composition for producing positive-type resist compositions. Such resist composition is preferably used, for example, for preparing semiconductors using a 248 nm KrF or 193 nm ArF excimer laser, a vacuum ultraviolet (typically 157 nm) $F_2$ laser, electron beam or X-ray. In fact, the dissolution inhibitor, of which solubility in alkali aqueous solution changes by the action of acid, is characterized in that at least one of $R^2$ and $R^3$ is an acid-labile protecting group. This dissolution inhibitor is not further particularly limited in its structure. This acid-labile protecting group may be selected from the above-mentioned examples and is a functional group that is to be severed by acid. The above first or second resist composition is insoluble or very slightly soluble in alkali aqueous solution prior to the activating energy ray irradiation. The activating energy ray irradiation, however, generates an acid from the acid generator. Then, the polymer is hydrolyzed by this acid and thereby becomes soluble in alkali aqueous solution.

The above-mentioned acid generator for a resist composition is not particularly limited. It can be suitably selected from acid generators for chemically amplified resists. Examples of such acid generators are bissulfonyldiazomethanes, nitrobenzyl derivatives, onium salts, halogen-containing triazine compounds, cyano group-containing oximesulfonate compounds, and other oximsulfonate compounds. The acid generator may be used in the form of a single compound or a mixture of at least two compounds. The content of the acid generator in the resist composition may be 0.5-20 parts by weight, relative to 100 parts by weight of the polymer. If it is less than 0.5 parts by weight, the resist composition may become insufficient in image forming capability. If it is greater than 20 parts by weight, it may become difficult to prepare a uniform solution of the resist composition. Thus, the resulting solution may become inferior in storage stability.

The above-mentioned resist composition according to the present invention can be used in conventional resist patterning methods, as exemplified in the following. Firstly, a solution of the resist composition is applied to a supporting member (e.g., silicon wafer) by spin coating or the like, followed by drying to form a photosensitive layer. Then, the photosensitive layer is exposed to an excimer laser light from an exposure apparatus through a desired mask pattern, followed by heating. Then, a development treatment is conducted by using, for example, an alkali aqueous solution such as 0.1-10 wt % tetramethylammonium hydroxide aqueous solution, thereby obtaining a resist pattern conforming to the mask pattern.

According to need, it is optional to add a miscible additive to the polymer. Examples of such additive are additional resins, quencher, plasticizer, stabilizer, coloring agent, surfactant, tackifier, leveling agent, deforming agent, compatibility enhancing agent, adhesion enhancing agent, and antioxidant.

The following nonlimitative examples are illustrative of the present invention.

EXAMPLE 1

A fluorine-containing compound according to the formula 4 was synthesized by sequentially conducting the following steps (a), (b) and (c), as shown in the following reaction scheme.

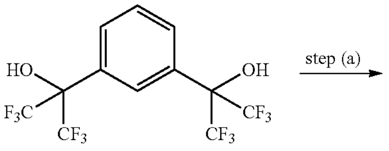

6

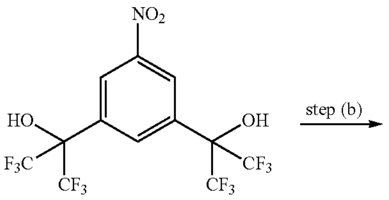

7

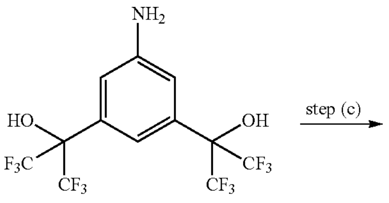

8

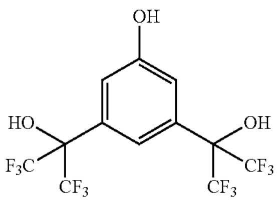

4

Step (a): Nitration

A three-necked flask equipped with a mechanical stirrer and a thermometer was charged with 1.83 liter of concentrated sulfuric acid and 1 kg of the compound of the formula 6. Under cooling with ice, 0.74 liter of concentrated nitric acid were added dropwise, followed by stirring at room temperature for 18 hr. The reaction liquid was added to ice. The resulting aqueous layer was extracted two times with methylene chloride. The combined organic layer was washed with water and saturated brine, followed by drying with anhydrous magnesium sulfate and then filtration. Then, the filtrate was concentrated with an evaporator. The obtained residue was distilled under reduced pressure, thereby obtaining 1.05 kg of the compound of the formula 7 (yield: 95%). This compound was found to have the following NMR data.

$^1$H-NMR (TMS, $CDCl_3$): 4.13 (2H, br), 8.45 (1H, s), 8.78 (2H, s)

Step (b): Amination

A stainless steel (SUS), pressure-proof vessel was charged with 340 g of the compound of the formula 7, 3.4 g of palladium-carbon, and 1.36 liter of methanol. The internal temperature of the vessel was adjusted to 65° C., and hydrogen was introduced while maintaining the hydrogen pressure at 5 kgf/cm$^2$, followed by stirring for 3 hr. After the reaction, the reaction mixture was filtered under reduced pressure, and the filtrate was concentrated with an evaporator. The obtained solid was washed with methylene chloride, followed by filtration and vacuum drying, thereby obtaining 281 g of the compound of the formula 8 (yield: 88%). NMR data of this compound were as follows.

$^1$H-NMR (TMS, $CDCl_3$): 4.57 (2H, br), 5.91 (2H, s), 7.12 (1H, s), 7.29 (2H, s)

Step (c): Phenol Preparation

A three-necked flask equipped with a dropping funnel, a mechanical stirrer and a thermometer was charged with 20 g of the compound of the formula 8 and 300 ml of 20% sulfuric acid aqueous solution, followed by cooling to 0° C. Then, 19 ml of an aqueous solution containing 3.6 g of sodium sulfite in water were added dropwise, followed by stirring at 0° C. for 1 hr. The resulting reaction solution was added dropwise to 90 ml of 20% sulfuric acid aqueous solution. A black-color, oil-like substance precipitated in the lower layer was taken out and then washed with water. This product was subjected to a distillation under reduced pressure, thereby obtaining 8.5 g of the compound of the formula 4 (yield: 42%). NMR and GC-MS data of this compound were as follows.

$^1$H-NMR (TMS, $CDCl_3$): 3.73 (3H, br), 7.34 (2H, s), 7.66 (1H, s) GC-MS (EI method): m/e 426 ($M^+$)

EXAMPLE 2

A compound of the formula 5 was synthesized, as shown by the following reaction formula.

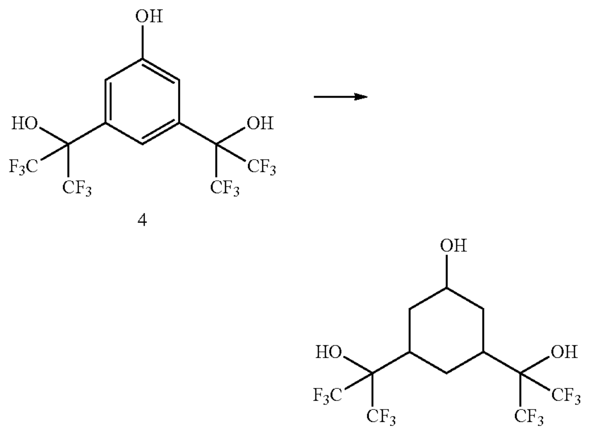

4 5

A stainless steel (SUS), pressure-proof vessel was charged with 50 g of the compound of the formula 4 and a suspension obtained by suspending 0.5 g of a rhodium-carbon catalyst in 200 ml of tetrahydrofuran (THF), followed by heating to 130° C. While the hydrogen pressure was maintained at 80 kgf/cm$^2$, hydrogen was introduced, followed by stirring for 4 hr. After the reaction, the catalyst was removed by filtration. The filtrate was concentrated with an evaporator, and the residue was distilled under reduced pressure, thereby obtaining 41 g of the compound of the formula 5 (yield: 85%). This compound was found by IR spectrum to show disappearance of a benzene ring.

EXAMPLE 3

A compound of the formula 9 was synthesized, as shown by the following reaction formula.

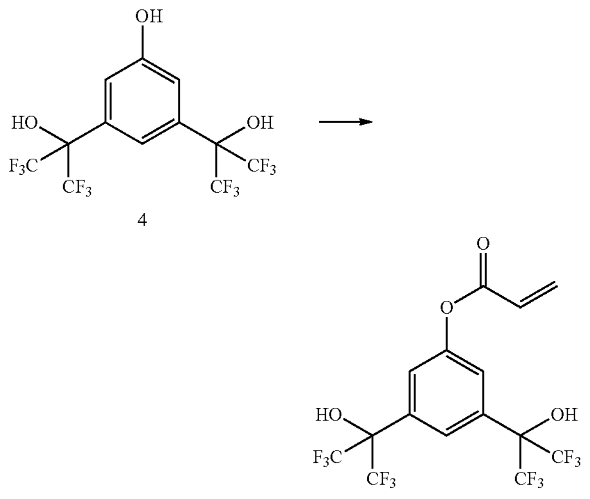

4 9

A three-necked flask equipped with a stirrer, a thermometer, a Dean-Stark trap for removing water, and a reflux condenser was charged with 15 g of the compound of the formula 4, a solution obtained by dissolving 3.8 g of acrylic acid in 50 ml of toluene, and 0.05 ml of concentrated sulfuric acid, followed by reflux for 5 hr. After the reaction, the reaction liquid was neutralized with saturated sodium hydrogencarbonate aqueous solution. The organic layer was washed with water and saturated brine, followed by concentration with an evaporator. The residue was distilled under reduced pressure, thereby obtaining 8.8 g of the compound of the formula 9 (yield: 52%). This compound was found by IR spectrum to show a specific absorption by a carbonyl of an ester (see the formula 9).

EXAMPLE 4

A compound of the formula 10 was synthesized, as shown by the following reaction formula.

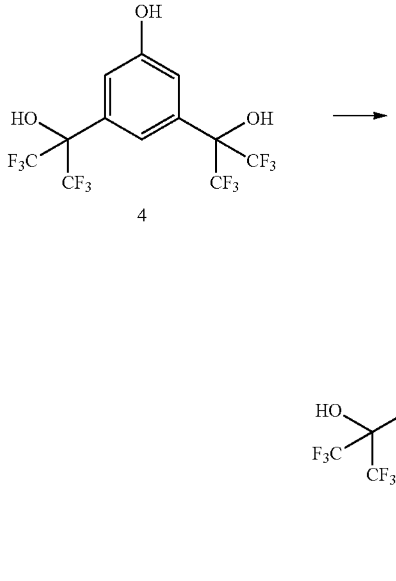

4 10

A three-necked flask equipped with a dropping funnel, a stirrer, and a thermometer was charged with 15 g of the compound of the formula 4, and a solution obtained by dissolving 8.9 g of triethylamine in 50 ml of methylene chloride. Under cooling with ice, 8.0 g of acrylic chloride were added dropwise, followed by stirring at room temperature for 3 hr. After the reaction, the reaction liquid was washed with water and saturated brine, followed by concentration with an evaporator. The residue was distilled under reduced pressure, thereby obtaining 12.0 g of a compound of the formula 10 (yield: 64%). This compound was found by IR spectrum to show a specific absorption by a carbonyl of an ester (see the formula 10).

EXAMPLE 5

A compound of the formula 11 was synthesized, as shown by the following reaction formula.

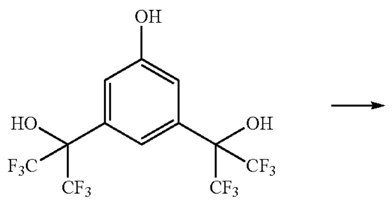

4

-continued

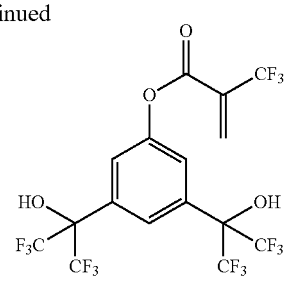

11

A three-necked flask equipped with a stirrer, a thermometer, a Dean-Stark trap for removing water, and a reflux condenser was charged with 15 g of the compound of the formula 4, a solution obtained by dissolving 7.4 g of trifluoromethylacrylic acid in 50 ml of toluene, and 0.05 ml of concentrated sulfuric acid, followed by reflux for 9 hr. After the reaction, the reaction liquid was neutralized with a saturated sodium hydrogencarbonate aqueous solution. The organic layer was washed with water and saturated brine, followed by concentration with an evaporator. The residue was distilled under reduced pressure, thereby obtaining 11 g of the compound of the formula 11 (yield: 58%). This compound was found by IR spectrum to show a specific absorption by a carbonyl of an ester (see the formula 11).

EXAMPLE 6

A compound of the formula 12 was synthesized, as shown by the following reaction formula.

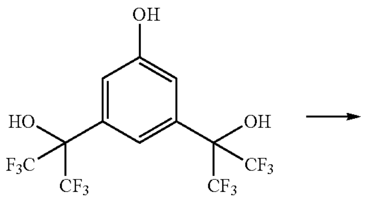

4

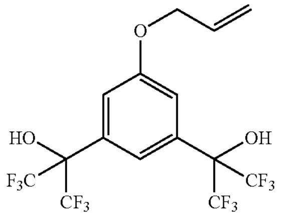

12

A three-necked flask equipped with a stirrer, a thermometer and a dropping funnel was charged with a solution obtained by dissolving 20 g of the compound of the formula 4 in 80 ml of dimethylformamide, followed by cooling with ice. Then, 3.4 g of sodium hydride were added, followed by stirring until the hydrogen generation terminated. After that, a solution obtained by dissolving 8.5 g of allyl bromide in 20 ml of dimethylformamide was added dropwise, followed by stirring at room temperature. After the reaction, water was added, followed by extraction with diethyl ether. The organic layer was washed with water and saturated brine, followed by distillation under reduced pressure, thereby obtaining 15.6 g of a compound of the formula 12 (yield: 72%). This compound was found by IR spectrum to show a specific absorption by a double bond (see the formula 12).

EXAMPLE 7

A compound represented by the formula 13 was synthesized, as shown by the following reaction formula.

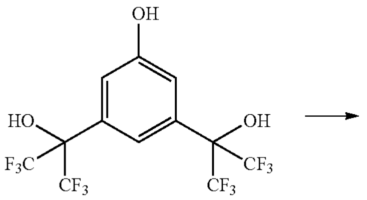

4

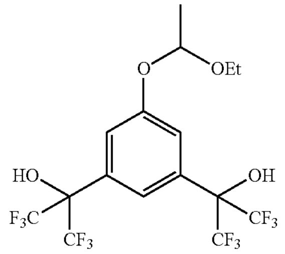

13

A three-necked flask equipped with a stirrer, a thermometer, and a reflux condenser was charged with 10 g of the compound of the formula 4, 2.5 g of ethyl vinyl ether, 0.4 g of paratoluenesulfonic acid monohydrate, and 60 ml of toluene, followed by stirring at room temperature for 7 hr. After the reaction, the reaction liquid was neutralized with saturated sodium hydrogencarbonate. The organic layer was washed with water and saturated brine, followed by concentration with an evaporator. The residue was distilled under reduced pressure, thereby obtaining 5.6 g of a compound of the formula 13 (yield: 48%). This compound was found by IR spectrum to show disappearance of a specific absorption by a hydroxyl group (see the formula 13).

EXAMPLE 8

A compound represented by the formula 14 was synthesized, as shown by the following reaction formula.

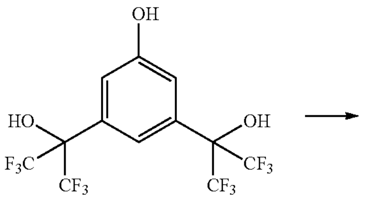

4

-continued

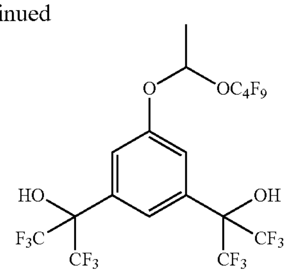

14

A three-necked flask equipped with a stirrer, a thermometer, and a reflux condenser was charged with 10 g of the compound of the formula 4, 9.2 g of nonafluorobutyl vinyl ether, 0.4 g of paratoluenesulfonic acid monohydrate, and 60 ml of toluene, followed by stirring at room temperature for 19 hr. After the reaction, the reaction liquid was neutralized with saturated sodium hydrogencarbonate. The organic layer was washed with water and saturated brine, followed by concentration with an evaporator. The residue was distilled under reduced pressure, thereby obtaining 5.7 g of a compound of the formula 14 (yield: 35%). This compound was found by IR spectrum to show disappearance of a specific absorption by a hydroxyl group (see the formula 14).

EXAMPLE 9

A compound of the formula 15 was synthesized, as shown by the following reaction formula.

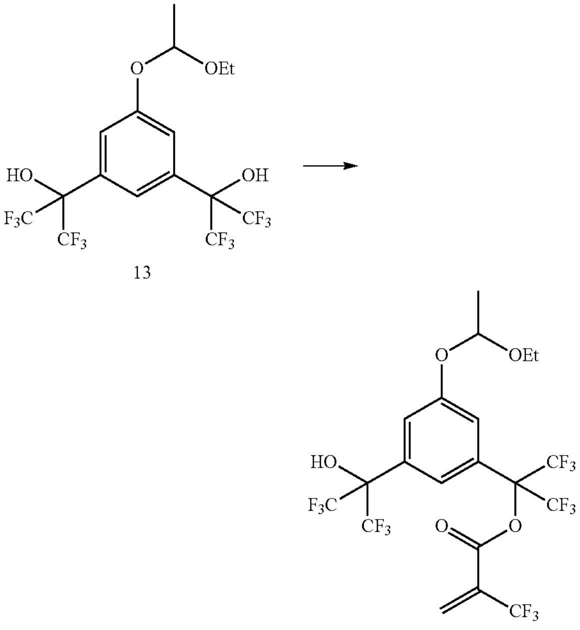

13

15

A three-necked flask equipped with a stirrer, a thermometer and a dropping funnel was charged with 18 g of the compound of the formula 13, 12.8 g of triethylamine and 45 ml of methylene chloride, followed by cooling with ice. A solution obtained by dissolving 8.6 g of trifluoromethylacrylic chloride in 20 ml of methylene chloride was added dropwise, followed by stirring at room temperature for 7 hr. After the reaction, the reaction liquid was washed with water and saturated brine, followed by distillation under reduced pressure, thereby obtaining 9.6 g of a compound of the formula 15 (yield: 43%). This compound was found by IR spectrum to show a specific absorption by a carbonyl of an ester (see the formula 15).

EXAMPLE 10

A compound of the formula 16 was synthesized, as shown by the following reaction formula.

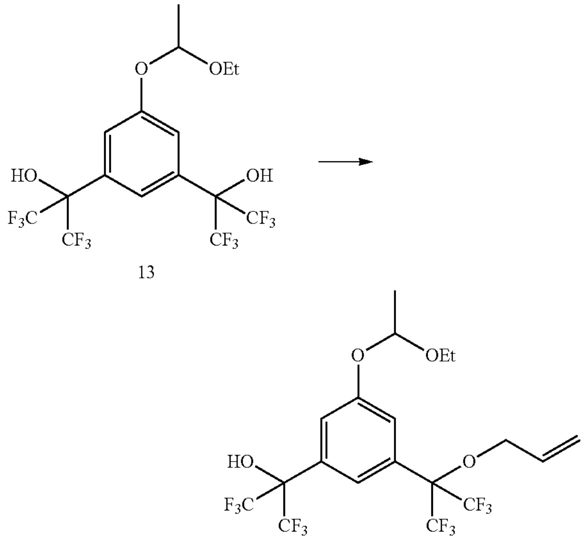

13

16

A three-necked flask equipped with a stirrer, a thermometer and a dropping funnel was charged with a solution obtained by dissolving 17 g of the compound of the formula 13 in 50 ml of dimethylformamide, followed by cooling with ice. Then, 2.0 g of sodium hydride were added, followed by stirring until the hydrogen generation terminated. After that, a solution obtained by dissolving 6.2 g of allyl bromide in 20 ml of dimethylformamide was added dropwise, followed by stirring at room temperature. After the reaction, water was added, followed by extraction with diethyl ether. The organic layer was washed with water and saturated brine, followed by distillation under reduced pressure, thereby obtaining 12.3 g of a compound of the formula 16 (yield: 67%). This compound was found by IR spectrum to show a specific absorption by a double bond (see the formula 16).

EXAMPLE 11

A compound of the formula 17 was synthesized, as shown by the following reaction formula.

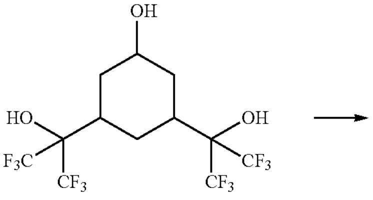

5

-continued

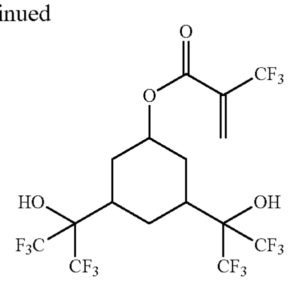

17

A three-necked flask equipped with a stirrer, a thermometer, a Dean-Stark trap for removing water, and a reflux condenser was charged with 30 g of the compound of the formula 5, a solution obtained by dissolving 15.9 g of trifluoromethylacrylic acid in 100 ml of toluene, and 0.1 ml of concentrated sulfuric acid, followed by reflux for 9 hr. After the reaction, the reaction liquid was neutralized with a saturated sodium hydrogencarbonate aqueous solution. The organic layer was washed with water and saturated brine, followed by concentration with an evaporator. The residue was distilled under reduced pressure, thereby obtaining 27.6 g of the compound of the formula 17 (yield: 73%). This compound was found by IR spectrum to show a specific absorption by a carbonyl of an ester (see the formula 17).

EXAMPLE 12

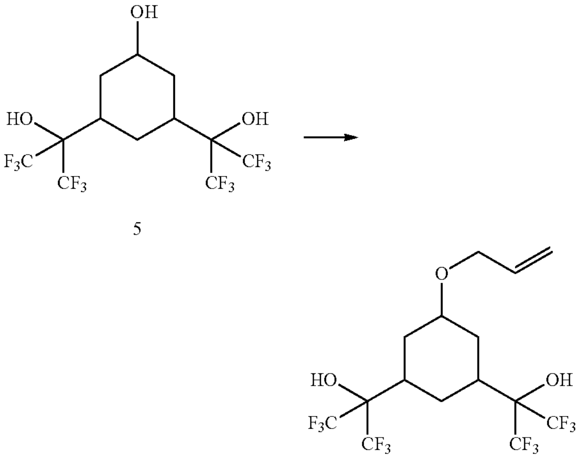

5

18

A three-necked flask equipped with a stirrer, a thermometer and a dropping funnel was charged with a solution obtained by dissolving 10 g of the compound of the formula 5 in 50 ml of dimethylformamide, followed by cooling with ice. Then, 1.8 g of sodium hydride were added, followed by stirring until the hydrogen generation terminated. After that, a solution obtained by dissolving 4.3 g of allyl bromide in 10 ml of dimethylformamide was added dropwise, followed by stirring at room temperature. After the reaction, water was added, followed by extraction with diethyl ether. The organic layer was washed with water and saturated brine, followed by distillation under reduced pressure, thereby obtaining 6.4 g of a compound of the formula 18 (yield:

63%). This compound was found by IR spectrum to show a specific absorption by a double bond (see the formula 18).

EXAMPLE 13

A compound of the formula 19 was synthesized, as shown by the following reaction formula.

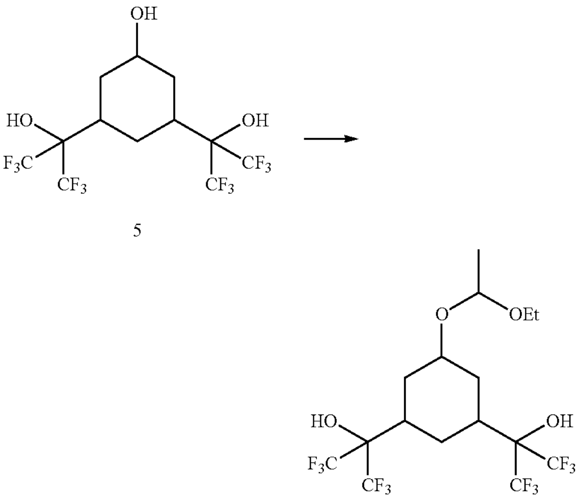

5

19

A three-necked flask equipped with a stirrer, a thermometer, and a reflux condenser was charged with 13 g of the compound of the formula 5, 3.3 g of ethyl vinyl ether, 0.5 g of paratoluenesulfonic acid monohydrate, and 70 ml of toluene, followed by stirring at room temperature for 4 hr. After the reaction, the reaction liquid was neutralized with a saturated sodium hydrogencarbonate aqueous solution. The organic layer was washed with water and saturated brine, followed by concentration with an evaporator. The residue was distilled under reduced pressure, thereby obtaining 8.3 g of a compound of the formula 19 (yield: 55%). This compound was found by IR spectrum to show disappearance of a specific absorption by a hydroxyl group (see the formula 19).

EXAMPLE 14

A compound of the formula 20 was synthesized, as shown by the following reaction formula.

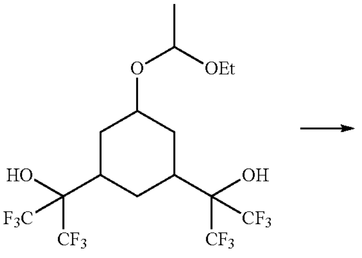

19

-continued

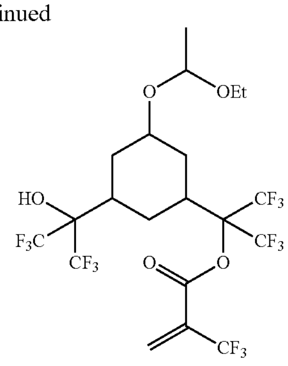

20

A three-necked flask equipped with a stirrer, a thermometer and a dropping funnel was charged with 9 g of the compound of the formula 19, 6.5 g of triethylamine and 20 ml of methylene chloride, followed by cooling with ice. A solution obtained by dissolving 4.4 g of trifluoromethylacrylic chloride in 20 ml of methylene chloride was added dropwise, followed by stirring at room temperature for 19 hr. After the reaction, the reaction liquid was washed with water and saturated brine, followed by distillation under reduced pressure, thereby obtaining 7.6 g of a compound of the formula 20 (yield: 68%). This compound was found by IR spectrum to show a specific absorption by a carbonyl of an ester (see the formula 20).

EXAMPLE 15

A compound of the formula 21 was synthesized, as shown by the following reaction formula. In the formula 21, —OMOM represents —O—$CH_2$—O—$CH_3$.

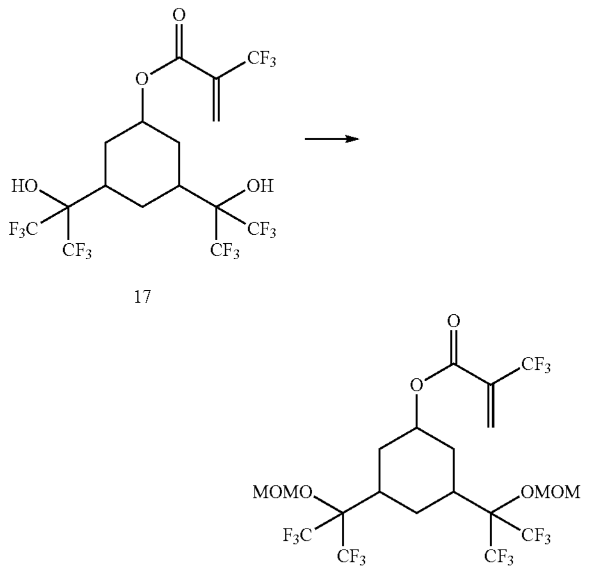

17

21

A three-necked flask equipped with a stirrer, a thermometer, and a dropping funnel was charged with 15 g of the compound of the formula 17, 13.1 g of potassium carbonate, and 100 ml of acetone. Then, 5.4 g of chloromethyl methyl ether were added, followed by reflux. After the reaction, water was added, followed by extraction with diethyl ether. The organic layer was washed with water and saturated brine, followed by distillation under reduced pressure, thereby obtaining 7.5 g of a compound of the formula 21 (yield: 43%). This compound was found by IR spectrum to show disappearance of a specific absorption by a hydroxyl group (see the formula 21).

EXAMPLE 16

A compound of the formula 23 was synthesized, as shown by the following reaction scheme.

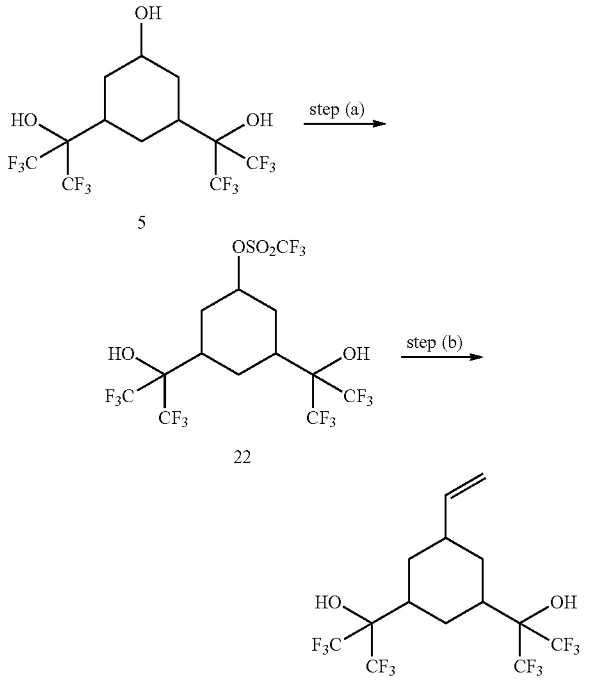

5

22

23

Step (a): Triflato Preparation

A three-necked flask equipped with a stirrer, a thermometer, a dropping funnel was charged with 20 g of the compound of the formula 5, 16.4 g of triethylamine, and 85 ml of methylene chloride, followed by cooling to −30° C. Then, 19.6 g of trifluoromethanesulfonic acid anhydride were added dropwise, followed by stirring for 5 hr. After the reaction, the organic layer was washed with water and saturated brine, followed by distillation under reduced pressure, thereby obtaining 14.9 g of a compound of the formula 22 (yield 57%). This compound was found by IR spectrum to show a specific absorption by sulfonyl group (see the formula 22).

Step (b): Vinylation

A three-necked flask equipped with a stirrer, a thermometer and a dropping funnel was charged with 10 g of the compound of the formula 22, 0.3 g of copper iodide, and 30 ml of THF, followed by cooling to −30° C. Then, a solution obtained by dissolving vinylmagnesium bromide in 30 ml of THF was added dropwise, followed by stirring for 18 hr. After the reaction, the organic layer was washed with water and saturated brine, followed by distillation under reduced pressure, thereby obtaining 5.7 g of a compound of the formula 23 (yield: 70%). This compound was found by IR spectrum to show a specific absorption by vinyl group (see the formula 23).

EXAMPLE 17

A compound of the following formula 11 was polymerized, as follows.

11

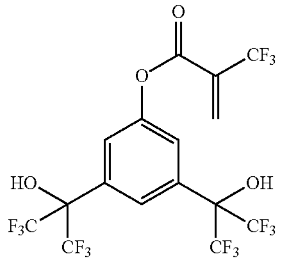

A three-necked flask equipped with a reflux condenser and a stirrer was charged with 10 g of the compound of the formula 11, 0.2 g of AIBN (a polymerization initiator), and 40 g of n-butyl acetate (a polymerization solvent), followed by heating in oil bath of 60° C. Under this condition, the reaction was conducted for 20 hr. After that, 1 liter of n-hexane was added to the reaction solution, followed by stirring. The resulting precipitate was separated by filtration and then dried under vacuum at 50° C. for 18 hr. The obtained polymer composition was determined by $^{1}$H-NMR and $^{19}$F-NMR. Its weight average molecular weight (Mw) and number average molecular weight (Mn) were determined by gel permeation chromatography (GPC) using polystyrene as a standard. The results of Examples 17-26 are shown in the following Table.

TABLE

| | Charged Monomers (g) | Yield (g) | Polymer Composition | Mn | Mw | Mw/Mn |
|---|---|---|---|---|---|---|
| Ex. 17 | 11(10 g) | 6.5 | 100/0 | 8,000 | 13,600 | 1.7 |
| Ex. 18 | 11(10 g)/24(8 g) | 10.5 | 42/58 | 9,000 | 17,100 | 1.9 |
| Ex. 19 | 15(10 g)/25(7.5 g) | 12.1 | 48/52 | 9,600 | 17,300 | 1.8 |
| Ex. 20 | 12(10 g)/26(10 g) | 5.9 | 32/68 | 7,200 | 12,700 | 1.8 |
| Ex. 21 | 17(8.2 g)/27(10 g) | 13.1 | 47/53 | 9,500 | 16,100 | 1.7 |
| Ex. 22 | 20(9.3 g)/25(10 g) | 11.7 | 30/70 | 8,500 | 15,500 | 1.8 |
| Ex. 23 | 18(10 g)/28(12 g) | 9.6 | 37/63 | 9,200 | 16,800 | 1.8 |
| Ex. 24 | 21(15 g)/29(7.7 g) | 12.8 | 55/45 | 8,800 | 17,000 | 1.9 |
| Ex. 25 | 20(10 g)/ 30(5.4 g)/31(6.8 g) | 14.2 | 39/ 21/40 | 9,700 | 17,700 | 1.8 |
| Ex. 26 | 23(10 g)/28(10 g) | 9.6 | 53/47 | 7,900 | 13,800 | 1.7 |

EXAMPLE 18

Example 17 was repeated except in that a compound (in an amount of 10 g) of the formula 11 was copolymerized with a compound (in an amount of 8.0 g) of the formula 24. In the formula 24, "tBOC" represents a t-butyloxycarbonyl group, —COOC$(CH_3)_3$.

11

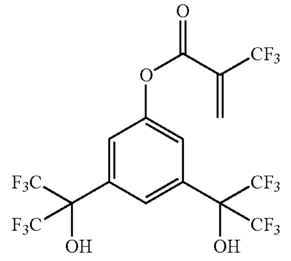

24

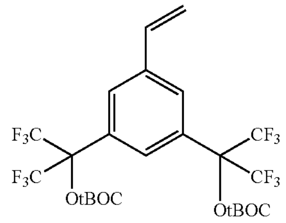

EXAMPLE 19

Example 17 was repeated except in that a compound (10 g) of the formula 15 was copolymerized with a compound (7.5 g) of the formula 25.

15

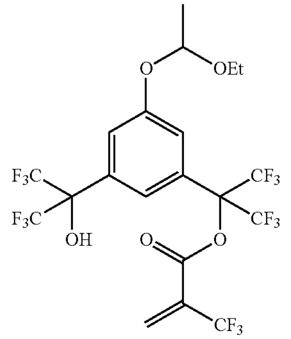

25

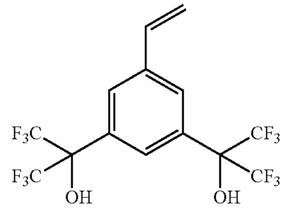

EXAMPLE 20

Example 17 was repeated except in that a compound (10 g) of the formula 12 was copolymerized with a compound (10 g) of the formula 26.

12

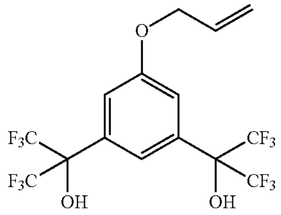

26

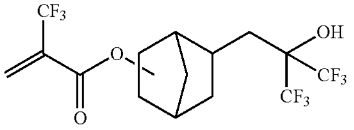

EXAMPLE 21

Example 17 was repeated except in that a compound (8.2 g) of the formula 17 was copolymerized with a compound (10 g) of the formula 27.

17

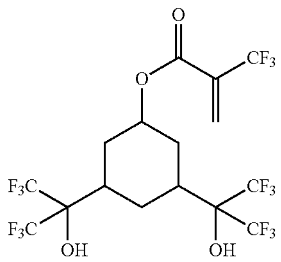

27

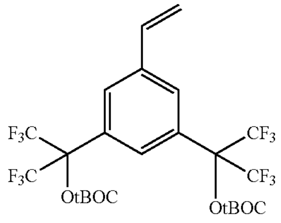

EXAMPLE 22

Example 17 was repeated except in that a compound (9.3 g) of the formula 20 was copolymerized with a compound (10 g) of the formula 25.

20

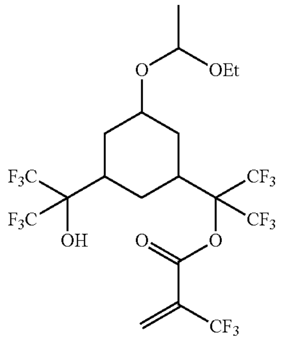

-continued

25

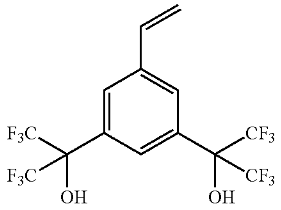

EXAMPLE 23

Example 17 was repeated except in that a compound (10 g) of the formula 18 was copolymerized with a compound (12 g) of the formula 28.

18

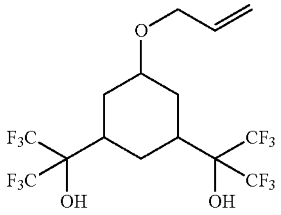

28

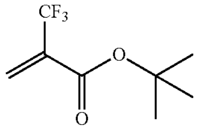

EXAMPLE 24

Example 17 was repeated except in that a compound (15 g) of the formula 21 was copolymerized with a compound (7.7 g) of the formula 29.

21

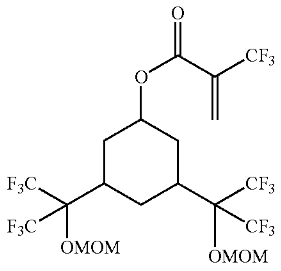

29

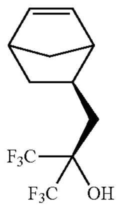

EXAMPLE 25

Example 17 was repeated except in that a compound (10 g) of the formula 20, a compound (5.4 g) of the formula 30, and a compound (6.8 g) of the formula 31 were copolymerized together.

20

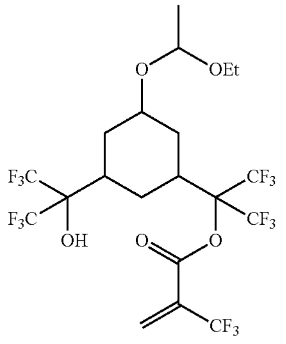

30

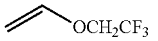

31

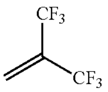

EXAMPLE 26

Example 17 was repeated except in that a compound (10 g) of the formula 23 was copolymerized with a compound (10 g) of the formula 28.

23

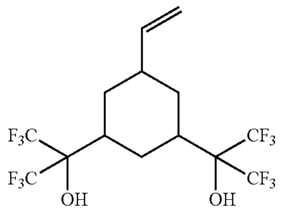

28

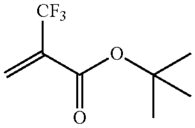

EXAMPLE 27

100 parts by weight of the polymer obtained in Example 17 were dissolved in methyl isobutyl ketone so that the resulting solution had a solid matter concentration of about 30%. The resulting coating liquid was applied to a glass plate to form thereon a film of 50 μm thickness. The film was subjected to a natural drying for 1 hr and then to a compulsory drying at 100° C. for 30 min with a hot air dryer to accelerate the crosslinking reaction. The resulting dried film was measured for refractive index using Abbe's refractometer. The result was 1.376.

Separately, the above solution (having a solid matter concentration of about 30%) was diluted to have a solid matter concentration of about 2%. The resulting solution was applied to a glass substrate by spin coating. The resulting film was subjected to a heat treatment at 100° C. for 3 min and then was found to have a thickness of 103 nm. The resulting coated glass was measured for reflectance at a wavelength of 650 nm. With this, the result was 0.9%, showing a sufficient anti-reflection property.

EXAMPLE 28

The polymers obtained in Examples 17-26 were dissolved in propylene glycol monomethyl acetate to have a solid matter concentration of 14%. Then, an acid generator, triphenylsulfonium triflate (TPS105) made by Midori Kagaku Co., Ltd., was dissolved in an amount of 2 parts by weight per 100 parts by weight of each polymer, thereby preparing resist solutions of Examples 17-26. These resist solutions were applied to substrates by spin coating. The resulting resist films were found to have light transmittances of 71%, 69%, 68%, 61%, 72%, 65%, 68%, 74%, 63%, and 71% in Examples 17-26 respectively at a wavelength of 157 nm and at a film thickness of 100 nm, showing high transparency in vacuum ultraviolet wavelength region.

Then, the above resist solutions were filtered with a membrane filer (pore diameter: 0.2 micrometers). The resulting resist solutions were applied to silicon wafers by spin coating to form resist films each having a thickness of 250 nm. Then, the resist films were subjected to a preliminary baking at 110° C., followed by exposure to a 248 nm ultraviolet ray through a photomask and then by a post exposure baking at 120° C. Then, the resist films were developed at 23° C. for 1 minute using 2.38 wt % tetramethylammonium hydroxide aqueous solution to form resist patterns. Each resist pattern had no development defects.

The invention claimed is:

1. A polymer prepared by a polymerization or copolymerization by directly using a fluorine-containing compound represented by formula 1, (1)

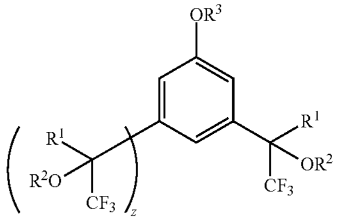

wherein $R^1$ is a methyl group or trifluoromethyl group, $R^2$ and $R^3$ each independently represent a hydrogen atom or a group containing (a) a hydrocarbon group having a straight-chain, branched or ring form and having a carbon atom number of 1-25, or (b) an aromatic hydrocarbon group wherein at least one of $R^2$ and $R^3$ comprises a functional group selected from the group consisting of vinyl group, allyl group, acryloyl group, and methacryloyl group optionally comprises a substituent having at least one fluorine atom substituted for a part or all<hydrogen atoms of the functional group; and the hydrocarbon group and the aromatic hydrocarbon group each independently and optionally containing at least one of a fluorine atom, an oxygen atom and a carbonyl bond, Z represents 0 or 1, and when at least one of $R^1$, $R^2$ and $R^3$ is in a plural number, the at least one of $R^1$, $R^2$ and $R^3$ may be identical with or different from each other.

2. A polymer according to claim 1, wherein at least one of $R^2$ and $R^3$ comprises a substituent selected from the group consisting of trifluorovinyl group, difluorotrifluoromethylvinyl group, fluoroacryloyl group, trifluoromethylacryloyl group, and nonylfluorobutylacryloyl group.

3. A polymer according to claim 1, wherein at least one of $R^2$ and $R^3$ comprises an acid-labile protecting group that optionally contains at least one of an oxygen atom, a carbonyl bond and a fluorine atom.

4. A method of using the polymer according to claim 1, in the manufacture of an anti-reflection coating material for an ultraviolet or visible light, comprising dissolving the polymer in a solvent to form the anti-reflection coating material.

5. A method of using the polymer according to claim 1 in the manufacture of a resist composition, comprising dissolving the polymer in a solvent to form the resist composition.

* * * * *